W. C. LIPE.
UNIVERSAL JOINT.
APPLICATION FILED NOV. 25, 1905.
942,087.
Patented Dec. 7, 1909.
2 SHEETS—SHEET 1.
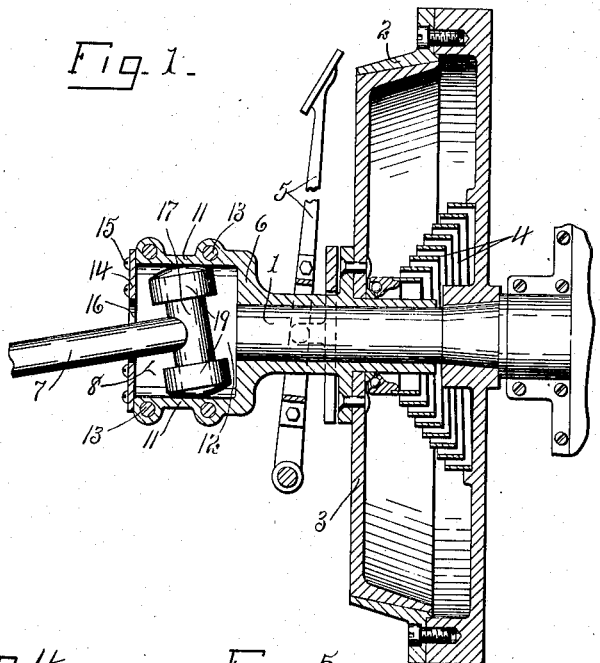
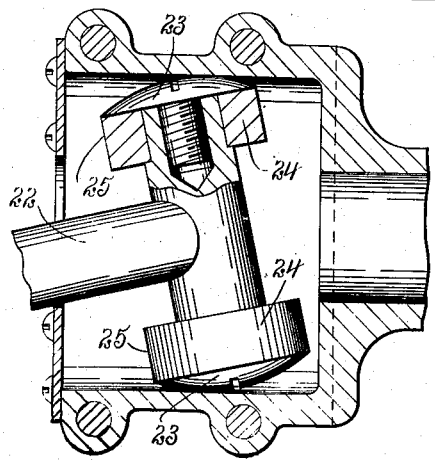
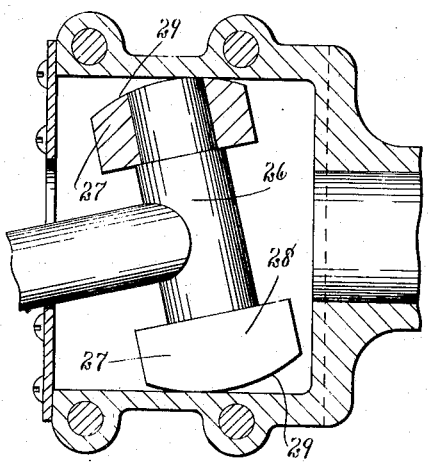
WITNESSES:
INVENTOR
Willard C. Lipe
BY
ATTORNEYS

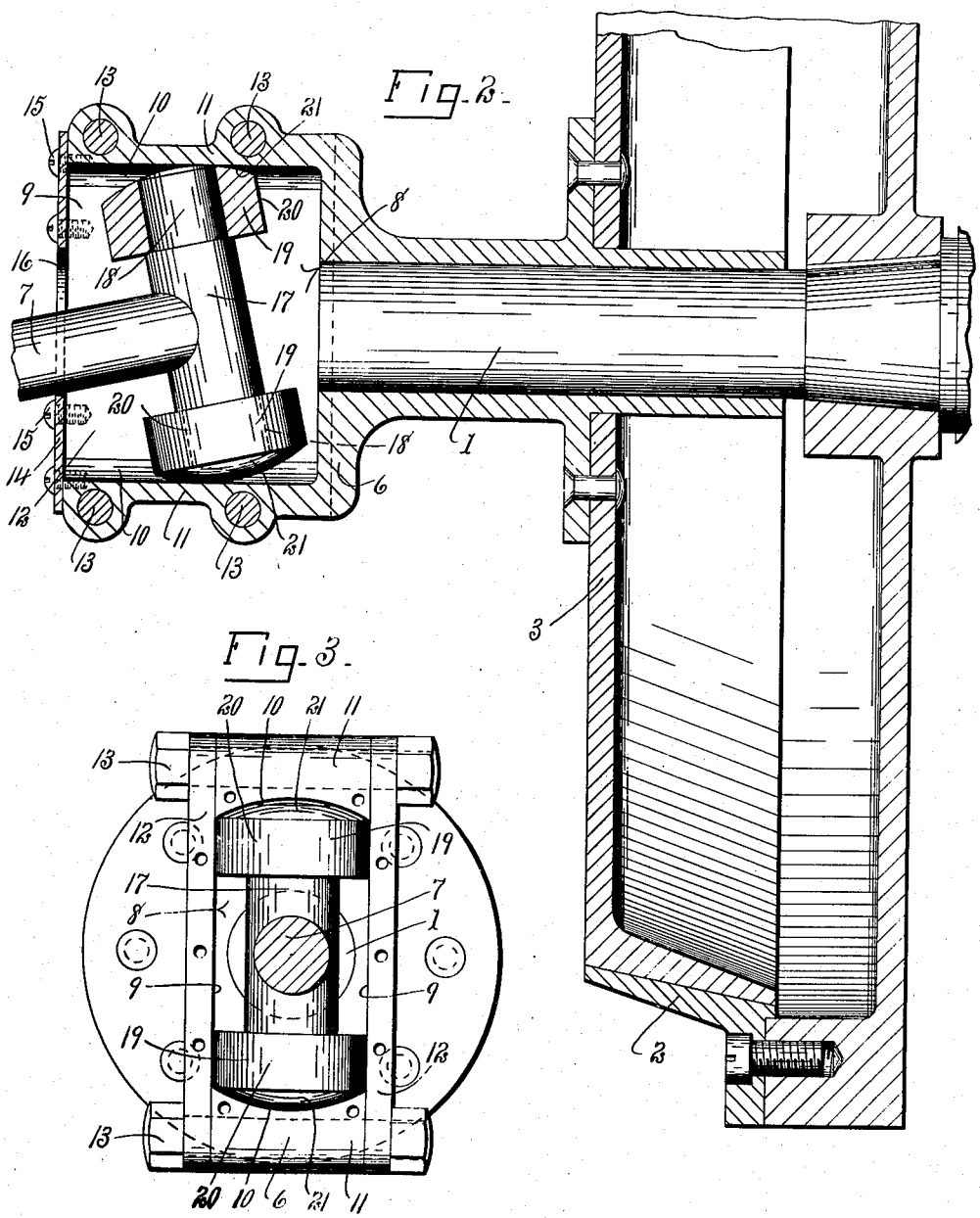

UNITED STATES PATENT OFFICE.

WILLARD C. LIPE, OF SYRACUSE, NEW YORK.

UNIVERSAL JOINT.

942,087. Specification of Letters Patent. Patented Dec. 7, 1909.

Application filed November 25, 1905. Serial No. 289,020.

*To all whom it may concern:*

Be it known that I, WILLARD C. LIPE, of Syracuse, in the county of Onondaga and State of New York, have invented a certain new and useful Universal Joint, of which the following is a specification.

My invention has for its object the production of a universal joint, which is particularly simple in construction and highly efficient and durable in use; and to this end, it consists in the combinations and constructions hereinafter set forth and claimed.

In describing this invention, reference is had to the accompanying drawings in which like characters designate corresponding parts in all the views.

Figure 1 is a sectional view, partly in elevation, of one embodiment of my invention. Fig. 2 is an enlarged sectional view, partly in elevation, of parts seen in Fig. 1. Fig. 3 is an end view, a portion of one of the joint-members being removed. Figs. 4 and 5 are sectional views, partly in elevation, of modified constructions of my invention.

In the drawings, my universal joint is shown as associated with a shaft 1, and clutch-sections 2, 3 coacting with each other, the section 2 being fixed to the shaft 1 and having an internal engaging face, and the section 3 being supported on the shaft 1 and having a peripheral engaging face, and being revoluble relatively to the shaft 1, and also movable axially relatively to said shaft into and out of engagement with the section 2. A suitable spring 4 may serve to engage the clutch-sections 3, 2, and a foot-lever 5 may be utilized to force the section 3 against the action of the spring 4 out of engagement with the section 2. Although the clutch-sections 2, 3, the spring 4, and the foot-lever 5 are particularly applicable for association with my universal joint, it will be apparent to those skilled in the art, that any other suitable means may be substituted therefor, and that said joint may be used without a clutch if desired.

The illustrated construction of my universal joint comprises driving and driven members 6 and 7, the member 6 being formed with an open ended socket 8, and the member 7 extending into the socket and being provided with means coacting with the walls of the socket 8 to effect the transmission of power from the member 6 to the member 7, and to permit either of the members 6, 7 to move axially relatively to the other, and the projecting end of the member 7 to move laterally in any direction. Although the member 6 having the socket 8 is generally utilized as the driving member, it is obvious that power may be transmitted to the member 7 for driving the member 6 provided with the socket 8.

In the preferable construction of my invention, the socket 8 is provided with opposing flat surfaces 9 and opposing cylindrically curved concave surfaces 10, but it is apparent that the concave surfaces 10 may be V-shaped in cross-section, if desired. Said socket 8 is preferably inclosed between arms 11 provided with the surfaces 10 and extending parallel to the axis of the member 6 and plates 12 provided with the surfaces 9 and secured to the side edges of the arms 11 by any suitable means, as bolts 13, the main portion or body of the member 6, the arms 11, and the plates 12 inclosing one end and the sides of the socket 8. The opposite end of the socket 8 is usually provided with any desirable closure, as a plate 14, secured thereto by screws 15 and formed with a central opening 16.

The member 7 projects through the opening 16, and includes a body 17 having oppositely extending trunnions 18 and engaging parts 19 journaled on the trunnions 18 at opposite sides of the axis of the member 6, each engaging part being formed with a cylindrically curved convex surface 20 for engaging the flat surfaces 9, and with a spherically curved surface 21 for engaging a cylindrically curved concave surface 10 of the socket 8. Said surfaces 21 preferably have the same radii as the concave surfaces 10, and are thus segments of a sphere which would fit a socket having the same radius as the surfaces 10. The body 17 is thus journaled in the engaging parts 19 and permitted to move about the axis of the trunnions 18 in any direction, and the engaging parts 19 being arranged at opposite sides of the axis of the member 6, turn freely on the trunnions 18, and also slide along the surfaces 10.

By those skilled in the art, it will be noted that when the free end of the member 7 is moved in a plane substantially parallel to the axis of the trunnions 18, the engaging parts 19 turn in reverse directions, and minimize the friction and strain on the universal joint.

In Fig. 4, I have shown a slightly different construction of my universal joint in which spherically curved surfaces for one of the joint-members 22, are provided on screws 23 which secure to said joint-member engaging parts 24 having peripheral engaging surfaces 25; and in Fig. 5, I have illustrated another construction of this invention, in which the body 26 of one of the joint-members is journaled in engaging parts 27 formed with flat sides 28 and crowning tops 29.

By those skilled in the art it will be understood that my joint is particularly applicable for use in driving mechanisms for automobiles, that such joint operates with minimum friction and strain on the parts, and that the illustrated exemplifications thereof are only a few of the many possible constructions of my invention.

The construction and operation of my universal joint will now be readily understood upon reference to the foregoing description and the accompanying drawing.

What I claim as new is:—

1. A universal joint comprising driving and driven members, one including a main body having arms arranged substantially parallel to the axis of said member and formed with opposing concave cylindrically curved faces, plates secured to the side edges of said arms and forming with the arms an open ended socket, and the other member projecting into the socket and having means coacting with the inner faces of said arms and plates, substantially as and for the purpose described.

2. A universal joint comprising driving and driven members, one including a main body having projecting arms substantially parallel to the axis of said member, plates arranged on opposite sides of said arms and forming with the arms an open ended socket, and fastening members passing transversely through the arms and the plates, and the other member projecting into said socket and having means coacting with the inner faces of said arms and said plates, substantially as and for the purpose set forth.

3. A universal joint comprising driving and driven members, one including a main body having projecting arms substantially parallel to the axis of said member, plates secured to the side edges of the arms, the body, the arms and the plates forming a socket having an open end, and a closure for the open end of the socket, said closure having an opening in its central portion, and the other member projecting through said opening and having means coacting with the inner faces of said arms and plates, substantially as and for the purpose described.

In testimony whereof, I have hereunto signed my name in the presence of two attesting witnesses, at Syracuse, in the county of Onondaga, in the State of New York, this 22nd day of November, 1905.

WILLARD C. LIPE.

Witnesses:
S. DAVIS,
E. SEEMILLER.